Patented Feb. 4, 1930

1,745,692

UNITED STATES PATENT OFFICE

RALPH A. HALLORAN, OF BERKELEY, WILLIAM N. DAVIS, OF OAKLAND, AND GEORGE A. DAVIDSON, OF SAN FRANCISCO, CALIFORNIA, ASSIGNORS, BY MESNE ASSIGNMENTS, TO STANDARD OIL COMPANY OF CALIFORNIA, OF SAN FRANCISCO, CALIFORNIA, A CORPORATION OF DELAWARE

PROCESS OF TREATING ACID SLUDGE AND FUEL PRODUCT OBTAINED THEREFROM

No Drawing. Application filed September 6, 1923. Serial No. 661,322.

Petroleum oils or distillates contain more or less of those constituents known as unsaturated, aromatic and more or less undesirable compounds. These materials are commonly removed, either partly or entirely, in the refining of such oils for various purposes. In the refining process such oils are treated with sulphuric acid, ranging in strength from approximately 66° Baumé acid to fuming acid and the unsaturated, aromatic and more or less undesirable compounds combine with the sulphuric acid, producing compounds which settle out from the treated oil in the form of a tarry sludge. This acid sludge contains not only the products of reaction but includes a percentage of uncombined acid.

Ordinarily such acid treatment is effected by more than one application of acid to the oil. To complete the settling out or precipitation from the oil of the products of the reaction it is customary, after the last application of acid to the oil, and after the removal of the acid sludge produced by the previous applications of acid, to add water to the oil and wash it with the same in the presence of the products of the reaction and such quantities of acid which may exist in the oil. This washing of such oil with water causes the reaction products and uncombined acid which would otherwise tend to remain suspended in the oil to collect or gather together and settle out of the oil. When, therefore, the treated oil is removed there remains a weak acid in which there are intermingled the reaction products thus separated from the oil. Due to the character and degree of treatment and to the reaction with the water at the relatively low temperature employed, the reaction products in such weak acid are those most difficult to hydrolyze. Such weak acid so contaminated by such reaction products we herein term a "dirty acid".

Another source of such a dirty weak acid is the combined acid sludge produced by the treatment of oils with fuming or highly concentrated acid where this acid sludge is subjected to the ordinary steam operation to recover some of the acid and produce a tar. The acid thus separated out is a weak and dirty acid substantially similar to the first dirty acid described in that it contains material quantities of the products of the reaction and such products are in a state more difficult to hydrolyze than the ordinary combined acid sludge. This dirty weak acid has heretofore been a nuisance and loss about a refinery as ordinary methods of purification and concentration have been found either ineffectual or not economical.

An ordinary example of such a dirty weak acid, i. e.—a solution of the more complex organic matter in weak sulphuric acid, has approximately the following proportions by weight:—60% $H_2SO_4$; 35% water, and approximately 5% of reaction products capable of being separated into 2% of sulphuric acid ($H_2SO_4$) and 3% of tar or organic matter. The percentages given are relative and approximate.

The "acid sludge" to which we have heretofore referred may be distinguished from such weak dirty acid by reference to an example thereof, in which such "acid sludge" comprises relatively complex organic matter of the oil in relatively strong sulphuric acid. (75% to 80% $H_2SO_4$) in proportions by weight substantially: 35% of $H_2SO_4$; 10% water and 55% of sulphonic acids or certain products of reaction, which certain products of reaction when hydrolyzed will yield approximately 15% of sulphuric acid ($H_2SO_4$) and approximately 40% of tar or organic matter.

It is to be noted that the nature of the acid sludge obtained by acid treatment of petroleum oils varies greatly. The factors which govern the nature of such sludge are the gravity of the petroleum oils or distillates treated, the nature of the unsaturated, aromatic and more or less undesirable constituents present, the strength of the acid used in the treatment and the physical conditions under which the acid treatment is conducted, such as temperature, means and degree of agitation, proportion of oil and acid, etc. It naturally follows that the difficulties incurred in the treatment of these acid sludges and the products obtained thereby depend largely upon the nature of the sludge which is to be treated; and the examples heretofore given are solely examples of particular products, produced from specific oils under specific operations and conditions. The reaction of sulphuric acid on the unsaturated, aromatic and more or less undesirable constituents contained in the oil produces acid sludges which are quite different, having different properties and requiring different methods of treatment. Both the acid sludge and the dirty weak acid heretofore referred to are practically useless in the form produced. The difficulty of treating either of them has been found so great as to prevent economical recovery of the valuable constituents, and in fact, both such acid sludge and such dirty weak acid have been found nuisances about a refinery and considered waste material which must be disposed of at a loss.

An object of our invention is to produce from such acid sludge a valuable fuel having a sufficiently high thermal value and in such form as to be conveniently consumed, and to recover the sulphuric acid content in such form as to be readily concentrated into acid of strength for use in further acid treatment operations.

A further object of the invention is to utilize such dirty acid as a diluent for such acid sludge, thereby reducing the resistance of the component parts of the acid sludge to the hydrolyzing reaction and rendering the treatment less difficult; also rendering such dirty acid a source from which valuable material is recovered instead of being a mere nuisance and waste.

To this end an object of our invention is to utilize such dirty weak acid as a means for supplying to the acid sludge all or a material part of the water required for the hydrolyzing reaction of the acid sludge, and, at the same time, utilizing the beneficial effects of the free acid of such dirty acid in the starting and controlling of the hydrolyzing action of the acid sludge.

As an illustration of a process embodying the several features of our invention, the acid sludge is mixed in an insulated retort with the required amount of dirty acid and brought to a temperature between 300° F. and 375° F. by injection of steam. The amount of water contained in such dirty weak acid and the steam so added should be sufficient to dilute the sulphuric acid produced by the process to a specific gravity of 1.526 (50° Baumé). The steam is preferably injected into the mass in the retort through a perforated pipe arranged in the bottom of the retort. When the temperature of the mass reaches the required point, the steam is shut off and the treatment proceeds under the heat of reaction. The pressure in the retort is held at between 80 to 100 pounds gage per square inch although pressures as low as 50 pounds per square inch may be utilized in some cases. This pressure will reach its maximum in from 10 to 25 minutes after the injection of the steam. The retort is so insulated as to retain the temperature of the reaction for a period of from two to four hours, which is sufficient time for the reaction. At the end of this time the reaction has proceeded to such an extent that the separated acid is practically free from organic matter and adapted thereafter to be easily concentrated without excessive separation of tar, etc.

The tar or organic matter separates on top of the acid and is practically free from acid. The acid and tar are drawn separately from the retort, the acid being in a suitable condition for concentration and the tar available as a fuel or as a source of valuable products such as aromatic oils, solvents, etc. It is very important in treating certain acid sludges that a high degree of heat be maintained for a considerable period of time. A vital step in our process when treating acid sludge of extremely difficult or stubborn nature is the maintaining of this necessary hydrolyzing heat. The expense of maintaining this high heat is eliminated and the process made commercially adaptable by the utilization of the heat of reaction.

In order to provide a resultant fuel of desired thermal value sufficient to be economically and advantageously burned, we may add to the acid sludge before, or at the time it is introduced into the retort, a quantity of fuel oil. Such a fuel oil may be the tarry fuel resulting from the operation of our process, or it may be any crude oil or any distillate or residuum from petroleum distillation operations. By thus commingling such fuel oil with the acid sludge before the hydrolyzing reaction, a permanent mixing is effected and such fuel oil will not thereafter separate from the tar as will be found to be the case if it is attempted to mix fuel oil with the resultant tarry mass produced by the hydrolyzing action. The addition of such fuel oil to such acid sludge may be in such relative quantity as to raise the thermal value of the resultant fuel to the degree desired.

The result of this operation is twofold: The dirty weak acid is the source of production of clean acid and its contaminating matter is converted to available fuel. We are able, therefore, not only to recover as "clean acid" the acid content of this dirty acid without additional expense but on the other hand to utilize its hydrolyzing agent in the treatment of the acid sludge.

The use of such dirty weak acid as the diluent for the acid sludge by reason of the acidulated condition of the water thus utilized for the hydrolysis reaction materially facilitates the starting of the reaction.

We have found that when we use such dirty weak acid we are enabled to perform the hydrolyzing reaction in approximately one-half the time required where water is used. Furthermore, the hydrolyzing may be accomplished at a lower temperature than is required when water is used. By such use of a weak acid as a diluent we obtain a better control of the reaction. Utilizing the waste dirty weak acid enables us also to recover the valuable components of this hitherto waste product and to increase the quantity of clean acid recovered by a given operation.

In thus describing a preferred embodiment of our invention we have pointed out that the mass is raised to the reacting temperature by steam introduced through a perforated pipe located near the bottom of the retort. By so introducing the steam we are able to provide a thorough agitation thereby subjecting all portions of the material to direct heating resulting in heat economy and in time economy. With certain treatments we have found that where sufficient agitation is not accomplished by the injection of the steam, we can sufficiently agitate the mass to induce hydrolyzation by a partial release of the pressure so as to cause ebullition of the mass and then subsequently closing the pressure release valve on the retort to permit the building up of the desired pressure. It is obvious, therefore, that as a means of agitation, where the operation is carried on at a pressure of above 50 pounds gage we may secure the requisite agitation by a partial and intermittent release of pressure. However, in its broader aspects, our invention may be embodied in a process wherein no steam is employed and the retort externally heated, while any desired agitation may be secured by mechanical means. It will also be seen that our process may be carried out by first commingling the requisite amount of dirty acid and steam with the acid sludge and then introducing these ingredients in such commingled state into the retort for the completion of the reaction and for the separation of the resulting acid and tarry fuel; or by commingling and heating the dirty acid and acid sludge without steam and then introducing the commingled and heated mass into a heated retort for the completion of the reaction and for the separation of the resulting acid and tarry fuel. When the sludge and dirty acid, or sludge, dirty acid and steam, thus commingled, are introduced into the retort we have found it advantageous to introduce them continuously so that withdrawal of the separated acid, or tarry fuel, or both may be made continuous.

As the treated material is maintained at a temperature between 300°–375° F. while the separation takes place, we are also able to withdraw or discharge the dilute clean acid produced heated to this temperature. By discharging this into a suitable vaporizing tower provided with baffles or other suitable spreading devices the residual heat in the acid can be employed to accomplish a further concentration of the acid, by thus vaporizing and withdrawing a portion of the water content. We are thus able to effect several degrees of concentration of the acid produced.

Likewise we are able by withdrawing or discharging the liquid tar to utilize the residual heat thereof to vaporize and distill off a material part of the aromatic oils from the tar.

The weak acid so used by us as a diluent for the acid sludge may be any sulphuric acid of not more than 90% strength.

While the process and product herein described are well adapted to accomplish the objects of the invention, various modifications may be made therein without departing from the principles of the invention. This invention includes all such modifications and changes as come within the scope of the appended claims.

Certain features of the treatment of acid sludge not specifically claimed herein are described and claimed in our copending application Serial No. 661,323, filed at an even date with this application.

We claim:

1. The process of hydrolyzing the acid sludge obtained in the treatment of petroleum oils, which consists in mixing with the acid sludge the requisite dirty acid, maintaining the mass in a closed retort, supplying heat thereto to raise the mass to the high hydrolyzing temperature while maintaining a pressure of over 50 pounds gage thereon, causing agitation of the mass to facilitate the hydrolysis reaction by releasing a portion of the pressure and thereafter closing the retort against release of pressure, and after reaction started, maintaining the mass at the necessary hydrolyzing temperature by the heat of reaction and the application of said pressure.

2. The process of hydrolyzing acid sludge obtained in the treatment of petroleum oil, which consists in mixing with such acid sludge the requisite dirty acid and fuel oil, maintaining the mass in a closed retort, heating the mass in such retort to the high hydrolyzing temperature while maintaining the same under a pressure of over 50 pounds gage, and completing the hydrolysis and separation of the mass into acid and liquid fuel by maintaining the mass therein at the necessary hydrolyzing temperature by the heat of the reaction and the application of said pressure.

3. The process of treating acid sludge, which consists in mixing the acid sludge with dirty acid, maintaining the mass in a closed retort, raising the mass to the high hydrolyzing temperature, and completing the hydrolysis and separation of the sludge into acid and tar by maintaining the same in said retort at the necessary hydrolyzing temperature by means of the heat of the reaction and the application of over 50 pounds gage pressure, withdrawing the resultant tarry residue at the temperature of the reaction and distilling therefrom aromatic oil by means of the residual heat of the reaction.

4. A liquid fuel produced from intermingled fuel oil and acid sludge resultant from treatment of petroleum oil with sulphuric acid, from which mass, by hydrolysis, there has been separated substantially all the sulphuric acid component of such sludge.

5. The process of hydrolyzing acid sludge obtained from the treatment of petroleum oil, which consists in mixing acid sludge with dirty acid in proper proportions, heating the mass to the high hydrolyzing temperature, introducing the commingled and heated mass into a retort held under a pressure of over 50 pounds gage and maintaining the necessary high hydrolyzing temperature.

6. A liquid fuel produced from intermingled fuel oil, dirty acid and acid sludge, both of the latter being obtained in the treatment of petroleum oil with sulphuric acid, from which mass, by hydrolysis, there has been separated substantially all the sulphuric acid component of such sludge, and dirty acid.

7. A process of hydrolyzing acid sludge obtained in the treatment of petroleum oil which consists in mixing with the acid sludge, dirty acid and the required proportion of fuel oil, confining the mass in an insulated retort, injecting sufficient steam to raise the mass to the high hydrolyzing temperature, and maintaining the mass therein at such temperature by the heat of reaction and application of a pressure of over 50 pounds gage.

Signed at Richmond, California, this 1st day of September, 1923.

RALPH A. HALLORAN.
WILLIAM N. DAVIS.
GEORGE A. DAVIDSON.